May 9, 1950 C. G. JOHNSON 2,506,925

SLOTTED TURNTABLE AUTOMATIC PHONOGRAPH

Filed Nov. 23, 1945 3 Sheets-Sheet 1

INVENTOR.
Carl G. Johnson
BY John F. Eakins
ATTORNEY

INVENTOR.
Carl G. Johnson
BY John F. Eakins.
ATTORNEY

INVENTOR.
Carl G. Johnson
BY John F. Eakins
ATTORNEY

Patented May 9, 1950

2,506,925

UNITED STATES PATENT OFFICE 2,506,925

SLOTTED TURNTABLE AUTOMATIC PHONOGRAPH

Carl G. Johnson, Chicago, Ill., assignor to J. P. Seeburg Corporation, Chicago, Ill., a corporation of Illinois Application November 23, 1945, Serial No. 630,343

22 Claims. (Cl. 274—10)

This invention relates to phonographs and has for its principal object to provide an improved turntable mechanism and associated phonograph elements whereby a succession of disc records may be played on both sides and the played records stored in a convenient stack.

In accordance with the present invention I provide a small turntable which is adapted to be mounted upon a rotating spindle so as to be driven thereby in one direction or the other. The turntable is relatively small so that it does not extend below the part of the record which is occupied by the recording groove so that both recorded surfaces are available for cooperation with a stylus. The spindle is driven in one direction when the upper surface of the record is being reproduced and it is driven in the opposite direction when the lower recorded surface of the record is being reproduced. The turntable is removable laterally from the spindle so that the played record is permitted to drop down the spindle after the turntable is laterally removed.

The invention will more readily be understood from the following description of a preferred embodiment taken in conjunction with the accompanying drawings, in which.

Figures 1, 8, 9, 10, 11:
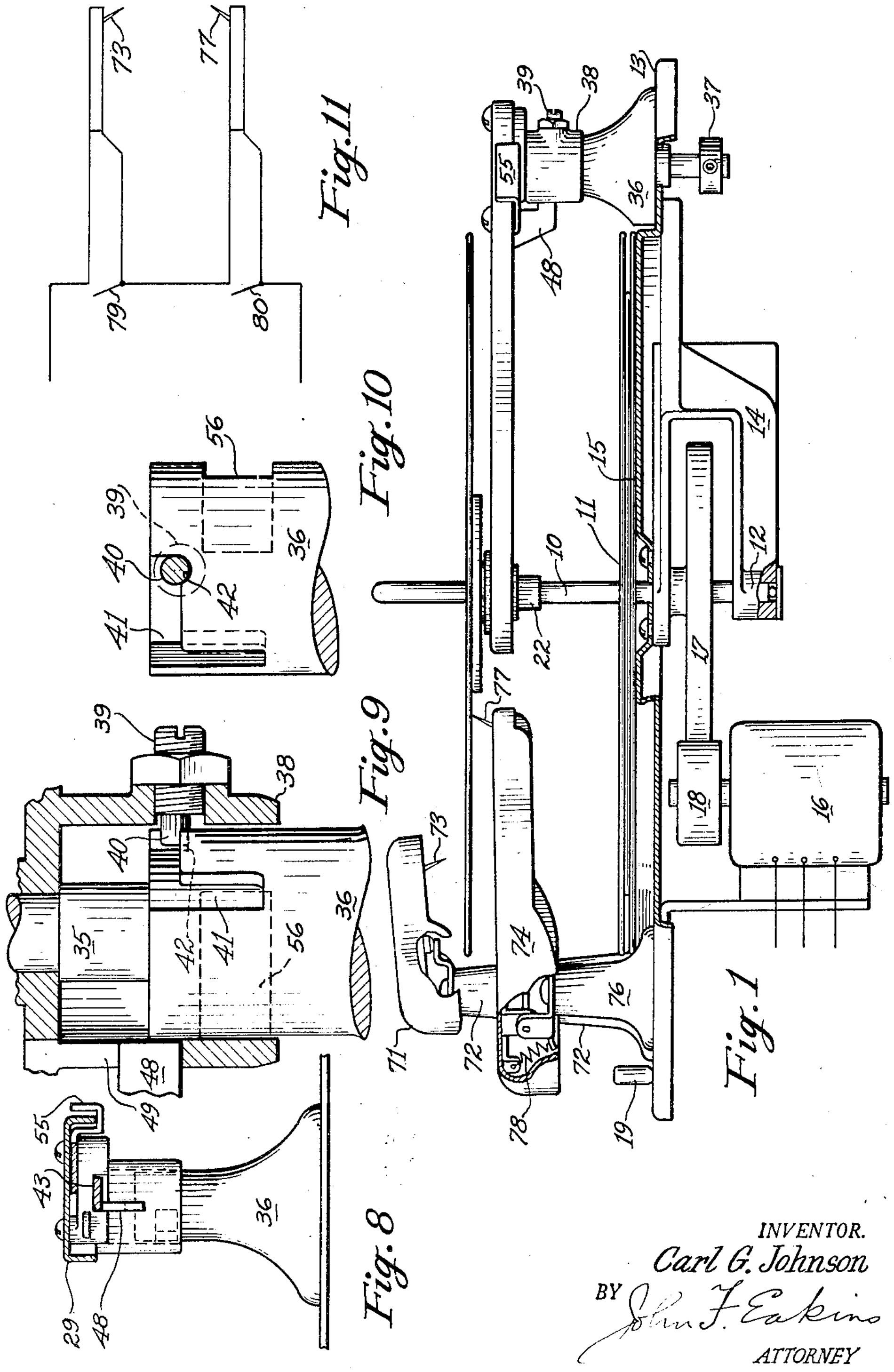
Figure 1 is an elevational view of a phonograph embodying my invention, parts of the motor board and the lower player arm being broken away, and the turntable being shown in playing position.
Fig. 8 is a sectional elevational detail of the turntable supporting arm, taken on the line 8—8 of Fig. 3.
Fig. 9 is a fragmentary elevational view of the hub of the turntable supporting arm and the standard which supports it as viewed in Fig. 3 but on a larger scale.
Fig. 10 is an elevational view of the upper end of the standard which supports the turntable supporting arm, as viewed in the right to left direction in Fig. 3, the projection 40 being shown in section in position corresponding to the extreme outward position of the turntable.
Fig. 11 is a wiring diagram.
Figures 2, 3:
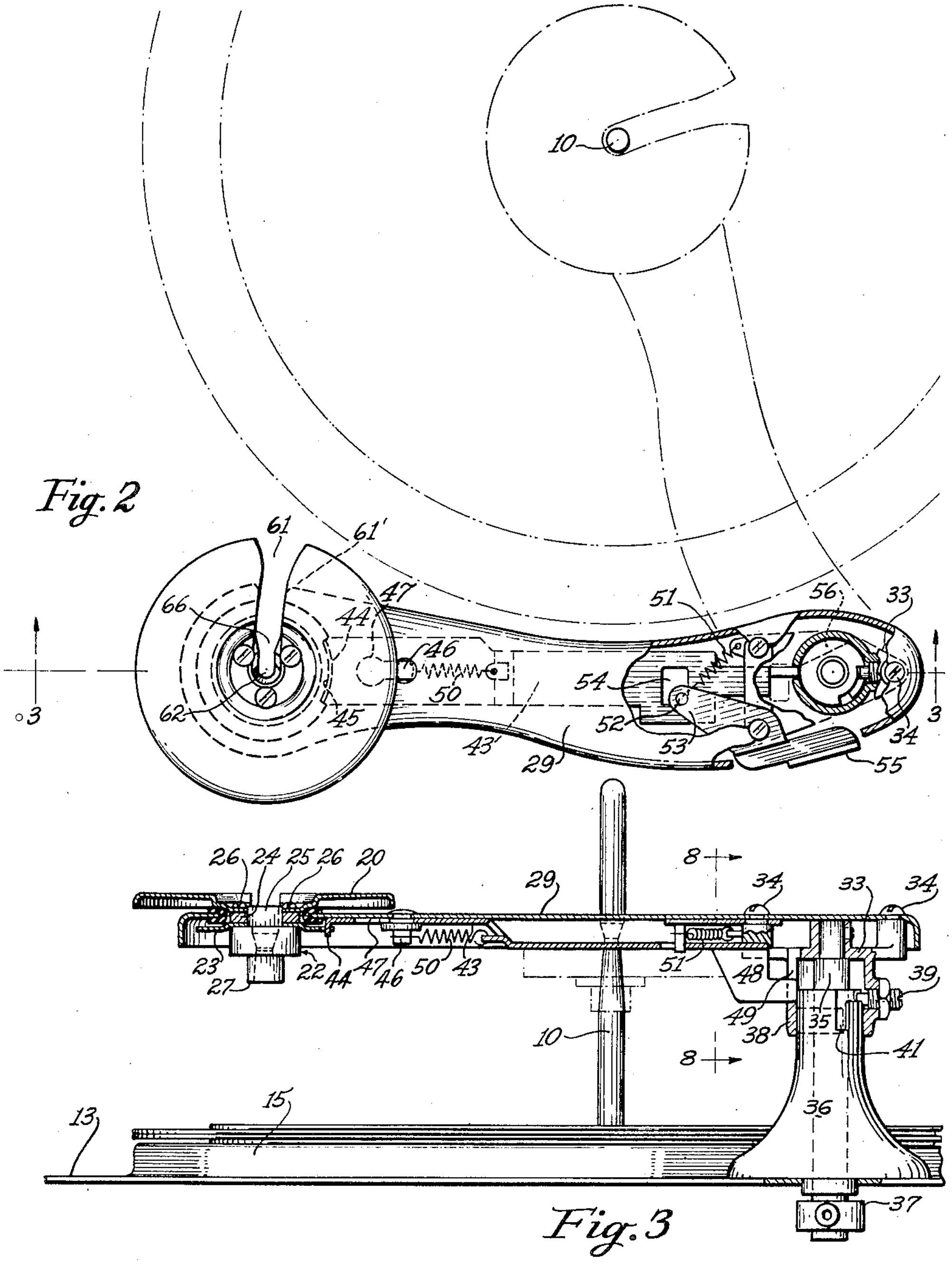
Fig. 2 is a fragmentary view showing the turntable assembly in its lateral position in full lines and in its playing position in phantom, relative to the spindle, part of the turntable support arm being broken away.
Fig. 3 is an elevational view of the elements shown in Fig. 3, the turntable and its support arm being in section taken on the line 3—3 of Fig. 2.

Referring to the drawings the reference numeral 10 designates a vertical spindle which is rotatably mounted in bearings 11 and 12 carried by a motor board 13 and a bracket 14 mounted on the lower side of the motor board 13, respectively. The spindle is relatively tall and its maximum diameter is slightly smaller than the central openings in disc records so that such records may be centered by the spindle and that the played records may descend downwardly on to a stationary support 15 which may be integral with the motor board 13. The spindle is driven in one direction or in the other direction by a reversible motor 16 mounted on the under side of the motor board 13. The drive of the spindle 10 from the motor 16 may be effected by means of a wheel 17 carried by the spindle below the motor board 13, this wheel engaging a resilient drive wheel 18 carried by the shaft of the motor. A switch 19, suitably mounted on the motor board, determines the direction of rotation of spindle 10.

The turntable 20 may be slightly more than about three inches in diameter, so that a record supported thereon has the complete recording grooves on both sides exposed for cooperation with a stylus. The central part of the turntable is dished downwardly to provide a mounting flange 21 below the level of the upper surface of the turntable. The turntable 20 is mounted by its flange 21 upon a central depending hub 22. The hub 22 is shouldered to receive a disc 23, a collar 24 and the mounting flange 21. The upper reduced portion 25 of the hub 22 closely fits into the central openings in the mounting flange 21 and the disc 23 and the opening in the collar 24. These elements are secured together by screws 26 which extend into the main body of the hub 22. The lowermost portion 27 of the hub may be reduced if desired. The central portion of the disc 23 is dished upwardly so as to provide between the disc 23 and the turntable 20 a generally V-shaped recess 28 around the collar 24.

The turntable 20 and the elements secured thereto are supported on an arm 29 which is in the form of an inverted channel. The arm 29 is provided with an opening 30 the periphery of which extends into the recess 28. When the turntable is being assembled the disc 23 is located below the arm 29 and the turntable 20 is located above it. The opening 30 receives a grommet 31 of rubber or other suitable material and the turntable 20 is provided with a formation 32 which is arranged to engage the grommet 31 and center the turntable 20 relative to the opening 30. It is to be understood that when the turntable is raised slightly relative to the arm 29 the turntable assembly is free from engagement with the grommet 31 or any part of the arm 29. At its end opposite the end on which the turntable 20 is mounted the arm 29 has secured thereto on its under side by means of screws 34 a spider 33. This spider is rigidly secured to the upper end of a vertical bar 35 which is mounted for movements in the vertical direction and for rotation by a hollow post or standard 36 carried by the motor board 13. Vertical movements are limited by a collar 37 mounted on the lower end of the bar 35, which projects below the motor board. The distance between the axis of the bar 35 and the center of the turntable and the opening 30 is such that the swinging movement of the arm 29 brings the axis of the turntable into alignment with the axis of the spindle 10. The manner in which the coaxial relation with the turntable and the spindle is attained will hereinafter be more fully described.

The spider 33 carries a depending skirt or flange 38 which overlaps the upper end of the standard 36. A set screw 39 having an excentric inner end 40 is mounted in the skirt 38 so that this inner end extends into an inverted L slot 41 which is cut in the upper end of the standard 36. The collar 37 prevents vertical movement of the arm 29 sufficient to remove the end 40 out of the horizontal portion of the slot 41 so that this portion of the slot provides stops limiting the swinging movement of the arm 29 in either direction. At the end remote from the vertical portion of the slot 41 the standard is provided with a notch 42 for the end 40 of the set screw 39 so that when the arm 29 is swung outwardly the arm moves downward slightly and the cooperation of the end 40 with the notch 42 opposes accidental inward movement of the arm 29. When the arm 29 is swung inwardly to bring the turntable 20 into coaxial relation with the spindle 10 the arm 29 is free to move downwardly, the end 40 of the set screw 39 moving downwardly in the vertical portion of the slot 41 until it is supported on the lower end of this vertical portion of the slot. Excentric relation of the inner end 40 of the set screw 39 permits adjustment of the relation of the arm 29 to the standard 36 so that the opening 30 may be accurately located in coaxial relation to the spindle when the arm 29 is swung into its innermost position.

On the under side of the arm 29 is slidably mounted a bolt or locking bar 43. The outer end of the bar 43 is turned downwardly to provide a flange 44 in alignment with the periphery of the disc 23. This disc is provided on its circumference with a notch 45 and the flange 44 is shaped so that it may move into the notch 45 and lock the turntable in a definite position relative to the arm 29. The flange 44 is arcuate in plan and it is arranged to seat closely within the wide notch 45. The bolt or locking bar is slidably mounted on the under side of the arm 29 by means of a stud 46 and slot 47 and by means of a projecting integral portion 48 which extends into a vertical slot 49 in the skirt 38. The bolt 43 is biassed towards locking engagement with the disc 23 by means of a relatively weak spring 50. A stronger spring 51 connected to the spider 33 and to a pin 52 tends to move the bolt 43 away from the disc 23. The pin 52 is carried by an actuating lever 53 which is pivotally mounted on the arm 29 by means of one of the screws 34 and the pin 52 projects downwardly into an opening 54 in the bolt 43. The lever 53 carries a portion 55 near the standard 36 which is adapted to be engaged by the operator's thumb. It will hereinafter appear that when the turntable is in coaxial relation with the spindle 10 the position of the bolt 43 is determined by the spring 51 which overcomes the spring 50 so that the turntable is free for rotation in its coaxial position with the spindle. When the operator seizes the pivoted end of the arm 29 for manual manipulation he presses the thumb piece 55 and swings the pin 52 away from the axis of the bar 35 so that the spring 50 is now free to bias the bolt 43 into engagement with the periphery of the disc 23. When this is done the spindle is driving the turntable but when the notch 45 comes into register with the flange 44 of the bolt 43 this flange enters the notch and the drive of the turntable by the spindle is arrested.

A horizontal slot 56 is cut in the standard 36 some distance below its upper end. The chord which forms the base of this slot is at right angles to the line joining the centers of the spindle 10 and the bar 35. When a record is being played the projection 48 projects into the slot 56 so that the strong spring 51 holds the bolt 43 away from the disc 23. The overhanging part of the standard 36 above the slot 56 prevents upward displacement of the arm 29 until the thumb piece 55 is depressed and the bolt 43 is moved into locking engagement with the disc 23. Consequently the actuation of the thumb piece 55 results in the locking of the turntable assembly relative to the arm 29 and permits the operator to lift the arm 29 vertically, the end 40 of the set screw 39 moving upwardly through the vertical portion of the slot 41. When the end 40 of the set screw 39 is located in alignment with the horizontal portion of the slot 41 the arm 29 may be swung outwardly on the axis provided by the standard 36, removing the arm 29 and the turntable 20 out of alignment with a record which has been played on the turntable so that this record falls downwardly along the spindle 10 on to the support 15. It is to be noted that when the arm 29 is lifted while holding the thumb piece 55 in, the projection 48 is brought into alignment with the upper circular end of the standard 36, above the slot 56. Consequently the bolt 43 is held in locking position relative to the turntable assembly so that the definite position of the turntable assembly relative to the arm 29 is maintained until the arm 29 is swung inwardly again to bring the turntable assembly into coaxial relation with the spindle 10. When the arm 29 is permitted to descend by the registry of the end 40 of the set screw 39 with the vertical portion of the slot 41, the projection 48 is brought into register with the slot 56 and the spring 51 again becomes effective to unlock the turntable assembly.

At the level of the turntable assembly the spindle 10 is provided with a waisted portion 57 provided by an upwardly directed conical frustrum 58 and a downwardly directed conical frustrum 59 which are connected by a short cylindrical portion 60. The lower frustrum 58 may suitably be that of an 8° cone and the downwardly directed frustrum 59 may suitably be that of a 35° cone. The diameter of the cylindrical portion 60 may suitably be about six-tenths that of the spindle. The turntable 20 is provided with an arcuate slot 61 which is wide enough to receive freely the full diameter of the spindle. When the turntable is locked by the bolt 43 in the definite position referred to, the center of the arcuate path of the slot 61 coincides with the axis of the post 35, and the slot 61 registers with a similar slot 61′ in the arm 29. Consequently when the turntable 20 is locked in this definite position and the arm 29 is swung inwardly the spindle 10 is received in the slots 61 and 61′. The hub 22 is provided with a bore 62. The upper portion of this bore 62 is cylindrical and is somewhat larger than the major portion of the spindle 10. The lowermost portion of the bore is in the form of a conical frustrum 64 which has the same taper as the frustrum 58. The frustrum 64 is somewhat less than half the height of the frustrum 58. The frustrum 64 is connected to the cylindrical portion 63 of the bore 62 by means of an inverted frustrum 65 which may suitably be the frustrum of a cone having an angle of about 27°.

Figures 4, 5, 6, 7:
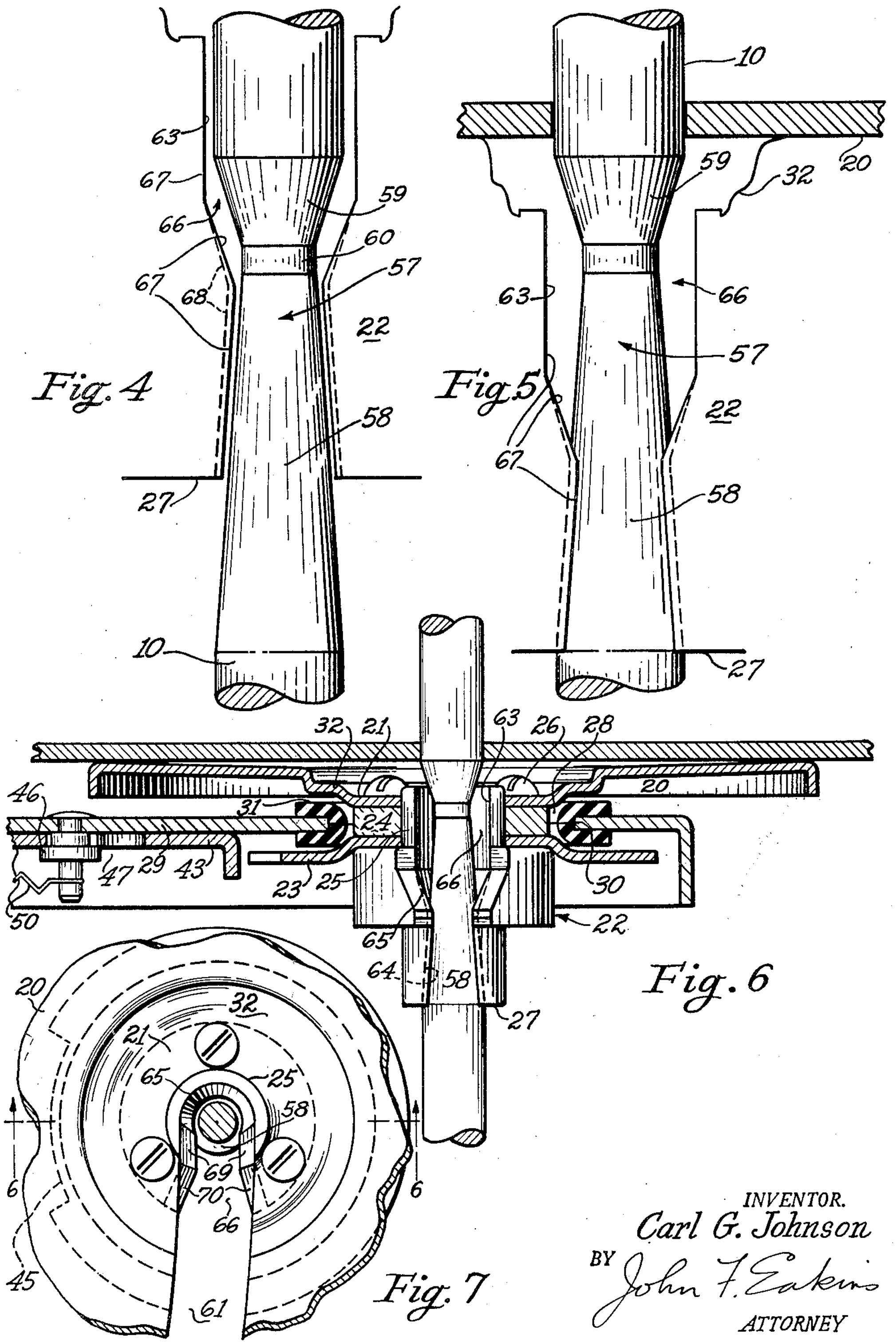
Fig. 4 is a diagrammatic view showing the structure which permits the turntable to move into and out of coaxial relation to the spindle.
Fig. 5 is a similar view showing the manner in which the turntable is seated on the spindle.
Fig. 6 is an elevational view of the spindle and the hub of the turntable in playing relation and associated elements in section taken on the line 6—6 of Fig. 7.
Fig. 7 is a plan view of the spindle and the central portion of the turntable in playing position thereon.

The slot 61 in the turntable extends into an aligned slot 66 in the hub 22 and the collar 24. The slot 66 registers with substantially less than half of the frustrum 64. For example approximately 120° of the frustrum 64 are cut away by the slot 66, leaving approximately two-thirds of the frustrum 64 to serve as a seat for the turntable assembly on the frustrum 58. The upper portion of the slot 66 is the same width as the diameter of the cylindrical portion 63. In Fig. 4 I show the hour glass portion of the spindle 10 in elevation and the lines 67 show in elevation the lines or formation created by the intersection of the slot 66 with the curved surfaces of the bore 62. The full width of the frustra 64 and 65 is shown by the dotted lines 68. In this figure the turntable assembly is at its high position, the end 40 of the set screw 39 being in the horizontal portion of the inverted L-slot 41. It thus will readily be understood that the inward movement of the arm 29 brings the turntable assembly into alignment with the spindle 10. In Fig. 5 I have shown a similar view showing the relation of the turntable assembly with the spindle after the projection 40 has dropped down the vertical portion of the slot 41, which occurs when the turntable assembly and the spindle are brought into coaxial relation seating the frustrum 64 on the corresponding frustrum 58 of the spindle. Since the frustrum 64 extends around the frustrum 58 for an angle of about 240° the turntable assembly is provided with a perfect seat upon the spindle. When the turntable assembly is thus seated on the spindle the grommet 31 is located in the center of the recess 28 so that the turntable is out of contact with the arm 29. It may be noted that the downward movement of the arm 29 brought the projection 48 of the bolt 43 into the slot 56 so that the bolt was drawn out of engagement with the disc 23 by the action of the spring 51.

The upper portion of the slot 66, that is the portion which extends into the cylindrical portion 63 and the inverted frustrum 65 extends outwardly from the center of the bore in a generally radial direction and then flares outwardly to the width of the slot 61. When the turntable assembly is moving into coaxial relation with the spindle 10, as shown in Fig. 4, the inverted frustrum 59 is in horizontal alignment with the inverted frustrum 65 and the sloping surfaces 69 and 70. The arrangement is such that ample clearance is provided for the passage of the turntable assembly but if due to wear of the grommet 31 the turntable assembly is displaced outwardly by the bolt 43 to interfere with the normal perfect clearance the inverted frustrum 59 engages the inner surface 70 and cams the turntable slightly inwardly along the arm 29 so that the turntable is brought substantially into coaxial relation with the spindle 10. When the arm 29 drops down and the bolt 43 is withdrawn the turntable assembly is completely freed from the arm 29 and the turntable seats perfectly upon the spindle 10. As has been previously pointed out the projection 40 of the set screw 39 provides a slight adjustment so that when the arm 29 moves downwardly the opening 30 and the grommet 31 are in perfect coaxial relation to the spindle 10.

Suitable player arm means are provided to cooperate with both recorded surfaces of a record seated on the turntable 20. Thus I may provide a normal player arm 71 carried by a standard 72 mounted on the motor board 13. The player arm is provided with a downwardly directed stylus 73. The needle pressure is arranged in known manner so that it does not displace the record out of its normal horizontal position on the turntable 20. A similar player arm 74 carried by a standard 76 also mounted on the motor board 13 is provided with an upwardly directed stylus 77 which is arranged to engage the recording surface on the under side of a record on the turntable 20. The player arm 74 is biased upwardly, for example by means of a spring 78 so that the stylus has the proper upward needle pressure. Here again the pressure is insufficient to displace the record out of its normal horizontal position. The pickups of the two player arms are connected in series. Each pickup may be shunted by switches 79 and 80 which may be associated with the reversing switch 19 so that when the motor 16 drives the turntable 20 in the direction for the reproduction of the upper side of the record, the lower pickup is shunted and vice versa.

In operation the arm 29 is swung inwardly so as to carry the turntable into alignment with the spindle 10. The arm 29 is allowed to descend so that the turntable is freely seated on the spindle. A record is placed on the turntable and the motor 16 is started so as to drive the turntable in one direction, this being controlled by the switch 19. The appropriate player arm 71 or 74 is then moved into engagement with the record and the recording on that side is reproduced. At the end of the reproduction the operating player arm is manually moved outwardly away from the record and the switch 19 is thrown so as to reverse the motor 16. The other player arm is now brought into engagement with the unplayed side of the record and that side is now reproduced. Of course only one side of a record may be reproduced if desired. When the reproduction is completed the operator actuates the thumb piece 55 so that the bolt 43 is biassed towards the disc 23 by the spring 50. The depending flange 44 of the bolt 43 moves into the notch 45 of the disc 23 when the notch comes into alignment with the bolt. Consequently the turntable is arrested, breaking the strong frictional engagement between the frustra 58 and 64. The turntable is now stationary, with its slot 61 in arcuate relation to the pivotal axis of the arm 29. The operator now raises the arm 29 bringing the projection 48 out of register with the slot 56 so that the turntable is effectively locked in its definite position independently of the actuation of the thumb piece 55. This upward movement brings the slot 66 into its relation with the spindle shown in Fig. 4. The arm 29 may now be swung outwardly clear of the record, which is retained by the spindle 10 extending through its center opening. When the arm 29 is fully withdrawn the record is free to drop on to the surface 15. It is to be noted that owing to the dished formation of the turntable a record being played is in alignment with the spindle 10 above the inverted frustrum 59 so that the record is properly centered by a portion of the spindle of full diameter.

After the played record has been dropped the turntable is again brought into operative relation with the spindle and another record is played in the manner above described.

While my improved mehanism has been described primarily with a manually operated phonograph, it must be stated that this mechanism is well adapted for use with machines in which the arm 29 and the player arm mechanism are automatically actuated.

Although the invention has been described in connection with specific details of a preferred embodiment thereof, it must be understood that such details are not intended to be limitative of the invention except in so far as set forth in the accompanying claims.

Having thus described my invention, I declare that what I claim is:

1. A phonograph comprising a record receiving spindle, a turntable, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, means for driving said turntable when in said coaxial relation, and player arm means adapted to cooperate with a record mounted on said spindle and on said turntable.

2. A phonograph comprising a record receiving spindle, a turntable, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, means for driving said turntable when in said coaxial relation, player arm means adapted to cooperate with a record mounted on said spindle and on said turntable, and a support below said turntable position arranged to receive a record retained by said spindle after the turntable has been moved outwardly clear of the record.

3. A phonograph comprising a record receiving spindle, a motor driving said spindle, a turntable, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be located in coaxial relation to said spindle and into a lateral position clear of a record mounted on said spindle, means for disengaging said locating elements when the turntable is in said coaxial relation, interengaging means on said turntable and spindle for operatively connecting the turntable and the spindle when the turntable and spindle are in coaxial relation, and player arm means adapted to cooperate with a record mounted on said spindle and on said turntable.

4. A phonograph comprising a record receiving spindle, a motor driving said spindle, a turntable, an arm carrying said turntable, said arm being pivotally mounted adjacent said spindle to carry said turntable in a plane which intersects said spindle, locating elements on said turntable and arm for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, means for disengaging said locating means when said turntable is in said coaxial relation, complementary engaging means on said turntable and spindle for operatively connecting the turntable and the spindle when the turntable and spindle are in coaxial relation, player arm means adapted to cooperate with a record mounted on said spindle and on said turntable, and a support below said turntable position arranged to receive a record retained by said spindle after the turntable has been moved outwardly clear of the record.

5. A phonograph comprising a record receiving spindle, a small turntable adapted to support a record with the recording grooves on both sides exposed, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation hith the spindle when the turntable is located in said position and the arm is swung about its pivotal axis whereby the turntable may be brought into coaxial relation to said spindle and into a lateral position clear of a record mounted on said spindle, motor means for driving said turntable in either direction when in said coaxial relation, and player arm means adapted to cooperate with either side of a record mounted on said spindle and on said turntable.

6. A phonograph comprising a record receiving spindle, a small turntable adapted to support a record with the recording grooves on both sides exposed, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, motor means for driving said turntable in either direction when in said coaxial relation, player arm means adapted to cooperate with either side of a record mounted on said spindle and on said turntable, and a support below said turntable position arranged to receive a record retained by said spindle after the turntable has been moved outwardly clear of the record.

7. A phonograph comprising a record receiving spindle, motor means for driving said spindle in either direction, a small turntable adapted to support a record with the recording grooves on both sides exposed, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, means for disengaging said locating means when said turntable is in said coaxial relation, complementary engaging means on said turntable and spindle for operatively connecting the turntable and the spindle when the turntable and spindle are in coaxial relation, and player arm means adapted to cooperate with either side of a record mounted on said spindle and on said turntable.

8. A phonograph comprising a record receiving spindle, motor means for driving said spindle in either direction, a small turntable adapted to support a record with the recording grooves on both sides exposed, an arm carrying said turntable, said arm being pivotally mounted adjacent said spindle to carry said turntable in a plane which intersects said spindle, locating elements on said arm and turntable for locating said turntable in a definite position relative to said arm, said turntable and arm being provided with slots which permit the turntable to be moved into and out of coaxial relation with the spindle when the turntable is located in said position and the arm is swung about its pivotal axis whereby the turntable may be brought into coaxial relation to said spindle and into a lateral position clear of a record mounted on said spindle, means for disengaging said locating means when said turntable is in said coaxial relation, complementary engaging means on said turntable and spindle for operatively connecting the turntable and the spindle when the turntable and spindle are in coaxial relation, player arm means adapted to cooperate with either side of a record mounted on said spindle and on said turntable, and a support below said turntable position arranged to receive a record retained by said spindle after the turntable has been moved outwardly clear of the record.

9. In a phonograph, in combination, a record receiving spindle having a waisted formation at an intermediate position, the lower portion of said formation being in the form of a tapering seat, and a turntable comprising a hub having a waisted bore, the lower portion of which constitutes a complementary tapering seat, said turntable having a slot adapted to receive freely said spindle, said hub being provided with a registering slot which extends into a minor portion of the circumference of its seat, the waisted formations being correlated so that the hub may be brought into axial alignment with the spindle at a certain elevation and the seat of the hub may be brought into engagement with the seat on the spindle by relative movement in the axial direction.

10. In a phonograph, in combination, a record receiving spindle having a waisted formation at an intermediate position, the lower portion of said formation being in the form of a tapering seat, and a turntable comprising a hub having a waisted bore, the lower portion of which constitutes a seat complementary to the wider part of the seat on the spindle, said turntable having a slot adapted to receive freely said spindle, said hub being provided with a registering slot which extends into a minor portion of the circumference of its seat, the waisted portions being correlated so that the hub may be brought into axial alignment with the spindle at a certain elevation and the seat of the hub may be brought into engagement with the seat on the spindle by relative movement in the axial direction.

11. A phonograph comprising a driven record receiving spindle having a waisted formation of general hour-glass shape, the lower part of the waisted formation being in the form of an upwardly tapering seat, a turntable, an arm pivotally mounted adjacent said spindle and loosely carrying said turntable in a plane which intersects the spindle in the zone of the waisted formation, a hub on said turntable having a bore of generally hour-glass formation which is shorter than the waisted formation on the spindle, the lower part of said bore being complementary to the lower part of the seat on said spindle, said arm, said turntable and said hub having slots which are in alignment with the spindle in one position of the turntable on said arm, locating elements on said arm and turntable for locating the turntable on the arm in this position, said slot in the hub extending into a minor part of the circumference of the seat on said hub, and a support for maintaining the arm at an elevation which permits the aligned slots to pass the waisted formation on the spindle and permitting the arm to descend when the turntable is in coaxial relation with the spindle whereby the seat on the hub is brought into engagement with the seat on the spindle, the arm is cleared from contact with the turntable and the locating elements are disengaged whereby the turntable is freely and accurately seated on the spindle for rotation therewith.

12. A phonograph comprising a driven record receiving spindle having a waisted formation of general hour-glass shape, the lower part of the waisted formation being in the form of an upwardly tapering seat, a turntable, an arm pivotally mounted adjacent said spindle and loosely carrying said turntable in a plane which intersects the spindle in the zone of the waisted formation and to move laterally away therefrom, a hub on said turntable having a bore of generally hour-glass formation which is shorter than the waisted formation on the spindle, the lower part of said bore being complementary to the lower part of the seat on said spindle, said arm, said turntable and said hub having slots which are in alignment with the spindle in one position of the turntable on said arm, locating elements on said arm and turntable for locating the turntable on the arm in this position, said slot in the hub extending into a minor part of the circumference of the seat on said hub, a support for maintaining the arm at an elevation which permits the aligned slots to pass the waisted formation on the spindle, and permitting the arm to descend when the turntable is in coaxial relation with the spindle whereby the seat on the hub is brought into engagement with the seat on the spindle, the arm is cleared from contact with the turntable and the locating elements are disengaged whereby the turntable is freely and accurately seated on the spindle for rotation therewith, an operable element for actuating the locating element on the arm into engagement with the locating element on the turntable, and an element associated with said arm for maintaining said locating elements in engagement when the arm is in elevated position.

13. A phonograph comprising a record receiving spindle and a motor driven rotatable support coaxial with said spindle, movable supporting means mounted adjacent said spindle, a record supporting turntable carried by said supporting means, said turntable being provided with a slot extending substantially to its center, said slot embracing said spindle, and interengaging means on said turntable and said rotatable support whereby said turntable is rotated, said slot being arranged to permit the turntable to be moved transversely away from the spindle by movement of said supporting means.

14. A phonograph comprising a record receiving spindle and a motor driven rotatable support coaxial with said spindle, movable supporting means mounted adjacent said spindle, a record supporting turntable carried by said supporting means, said turntable being provided with a slot extending substantially to its center, said slot embracing said spindle, interengaging means on said turntable and said rotatable support whereby said turntable is rotated, said slot being arranged to permit the turntable to be moved transversely away from the spindle by movement of said supporting means, and a player arm mounted adjacent said spindle and adapted to cooperate with a record mounted on said spindle and on said turntable.

15. A phonograph comprising a record receiving spindle and a motor driven rotatable support coaxial with said spindle, movable supporting means mounted adjacent said spindle, a record supporting turntable carried by said supporting means, said turntable being provided with a slot extending substantially to its center, said slot embracing said spindle, interengaging means on said turntable and said rotatable support whereby said turntable is rotated, said slot being arranged to permit the turntable to be moved transversely away from the spindle by movement of said supporting means, a player arm mounted adjacent said spindle and adapted to cooperate with a record mounted on said spindle and on said turntable, and a support below the operating position of said turntable for receiving a record retained by said spindle after the turntable has been moved transversely away from the spindle.

16. A phonograph comprising a rotatable record receiving spindle, movable supporting means mounted adjacent said spindle, a record supporting turntable carried by said supporting means, said turntable being provided with a slot extending substantially to its center, said slot embracing said spindle, and separable interengaging means on said turntable and spindle whereby the turntable is rotated, said slot being arranged to permit the turntable to be moved transversely away from the spindle by movement of said supporting means.

17. A phonograph comprising a rotatable record receiving spindle, movable supporting means mounted adjacent said spindle, a record supporting turntable carried by said supporting means, said turntable being provided with a slot extending substantially to its center, said slot embracing said spindle, separable interengaging means on said turntable and spindle whereby the turntable is rotated, said slot being arranged to permit the turntable to be moved transversely away from the spindle by movement of said supporting means, and a player arm mounted adjacent said spindle and adapted to cooperate with a record mounted on said spindle and on said turntable.

18. A phonograph comprising a rotatable record receiving spindle, movable supporting means mounted adjacent said spindle, a record supporting turntable carried by said supporting means, said turntable being provided with a slot extending substantially to its center, said slot embracing said spindle, separable interengaging means on said turntable and spindle whereby the turntable is rotated, said slot being arranged to permit the turntable to be moved transversely away from the spindle by movement of said supporting means, a player arm mounted adjacent said spindle and adapted to cooperate with a record mounted on said spindle and on said turntable, and a support below the operating position of said turntable for receiving a record retained by said spindle after the turntable has been moved transversely away from the spindle.

19. A phonograph comprising a record receiving spindle and a support coaxial with said spindle and rotatable in either direction, reversible drive means for rotating said support in either direction, movable supporting means mounted adjacent said spindle, a record supporting turntable carried by said supporting means, said turntable being sufficiently small to support a record with the recording surfaces of both sides exposed, said turntable being provided with a slot extending substantially to its center, said slot embracing said spindle, interengaging means on said turntable and said rotatable support whereby said turntable is rotated in either direction, said slot being arranged to permit the turntable to be moved transversely away from the spindle by movement of said supporting means, and player arm means arranged to cooperate with either side of a record mounted on said spindle and on said turntable.

20. A phonograph comprising a record receiving spindle and a support rotatable in either direction, movable supporting means mounted adjacent said spindle, a record supporting turntable carried by said supporting means, said turntable being sufficiently small to support a record with the recording surfaces of both sides exposed, said turntable being provided with a slot extending substantially to its center, said slot embracing said spindle, interengaging means on said turntable and said rotatable support whereby said turntable is rotated in either direction, said slot being arranged to permit the turntable to be moved transversely away from the spindle by movement of said supporting means, player arm means arranged to cooperate with either side of a record mounted on said spindle and on said turntable, and a support below the operating position of said turntable for receiving a record retained by said spindle after the turntable has been moved transversely away from the spindle.

21. A phonograph comprising a record receiving spindle rotatable in either direction, movable supporting means mounted adjacent said spindle, a record supporting turntable carried by said supporting means, said turntable being provided with a slot extending substantially to its center, said slot embracing said spindle, separable interengaging means on said turntable and spindle whereby the turntable is rotated in either direction, said slot being arranged to permit the turntable to be moved transversely away from the spindle by movement of said supporting means, and player arm means arranged to cooperate with either side of a record mounted on said spindle.

22. A phonograph comprising record receiving spindle rotatable in either direction, movable supporting means mounted adjacent said spindle, a record supporting turntable carried by said supporting means, said turntable being provided with a slot extending substantially to its center, said slot embracing said spindle, separable interengaging means on said turntable and spindle whereby the turntable is rotated in either direction, said slot being arranged to permit the turntable to be moved transversely away from the spindle by movement of said supporting means, player arm means arranged to cooperate with either side of a record mounted on said spindle, and a support below the operating position of said turntable for receiving a record retained by said spindle after the turntable has been moved transversely away from the spindle.

CARL G. JOHNSON.

REFERENCES CITED

The following references are of record in the file of this patent:

UNITED STATES PATENTS

| Number | Name | Date |
|---|---|---|
| 1,981,175 | Horn | Nov. 20, 1934 |

FOREIGN PATENTS

| Number | Country | Date |
|---|---|---|
| 395,137 | Great Britain | July 13, 1933 |